US006359399B1

(12) United States Patent
Omenigrandi

(10) Patent No.: US 6,359,399 B1
(45) Date of Patent: Mar. 19, 2002

(54) ELECTRONIC CONTROL SYSTEM WITH RADIO REMOTE CONTROL SETTING OF LIMIT STOPS FOR MOTORS FOR THE OPERATION OF WINDING DEVICES

(75) Inventor: Marco Omenigrandi, Rovereto (IT)

(73) Assignee: Deltron Ltd., Douglas (IL)

( * ) Notice: Subject to any disclaimer, the term of this patent is extended or adjusted under 35 U.S.C. 154(b) by 0 days.

(21) Appl. No.: 09/634,840

(22) Filed: Aug. 8, 2000

(30) Foreign Application Priority Data

| | | |
|---|---|---|
| May 5, 1998 | (IT) | MI98A000963 |
| Jan. 21, 1999 | (EP) | 99200173 |
| Sep. 24, 1999 | (AU) | 50140/99 |
| Feb. 28, 2000 | (HK) | 00101206 |

(51) Int. Cl.$^7$ .................... H04Q 7/00

(52) U.S. Cl. .................... 318/16; 318/266; 318/466; 318/468; 318/626

(58) Field of Search .................... 318/16, 626, 266, 318/466, 468

(56) References Cited

U.S. PATENT DOCUMENTS

| | | | | |
|---|---|---|---|---|
| 4,383,206 A | * 5/1983 | Matsuoka et al. | 318/445 |
| 4,638,433 A | * 1/1987 | Schindler | 364/400 |
| 4,712,104 A | * 12/1987 | Kobayashi | 340/325 |
| 5,278,480 A | * 1/1994 | Murray | 318/626 |
| 5,663,621 A | * 9/1997 | Popat | 318/480 |
| 5,919,239 A | * 7/1999 | Fraker et al. | 701/35 |

FOREIGN PATENT DOCUMENTS

| | | | |
|---|---|---|---|
| EP | 0671676 | 2/1995 | G05B/19/23 |
| EP | 0940736 | 1/1999 | G05B/19/23 |
| IT | VE97A000021 | 6/1997 | |
| WO | WO97/12109 | 9/1996 | E05F/15/20 |
| WO | WO96/39740 | 12/1996 | H02P/1/22 |

OTHER PUBLICATIONS

SL–7900RP "Palcom, Hi–Fi Stereo Satellite Receiver Manual" dated Jan. 10, 1996, p. 17.

* cited by examiner

*Primary Examiner*—Robert E. Nappi
*Assistant Examiner*—Rita Leykin
(74) *Attorney, Agent, or Firm*—Greenberg Traurig; Mark A. Wurm

(57) ABSTRACT

An electronic control system for motors for the operation of winding devices, such as roller shades, roller gates, rolling shutters and similar, comprises a radio receiver included in the motor being controlled and a portable radio transmitter available to the user. The radio transmitter comprises at least two push-buttons for the control of the lifting and lowering movement of the winding device and a first micro-controller provided with a first code memory that, at each pressure on at least one of said control push-buttons, sends a codified signal having a respective identification code of the push-button being pressed. The radio receiver comprises a second micro-controller with a second code memory, that at each signal being received with one of the codes of said second memory, generates a control signal for a control unit provided with a third memory that, upon reception of the control signal, starts the motor in one sense of rotation or in the opposite sense according to the identity of the push-button of the radio transmitter that is being pressed, and receives identification data of the angle of rotation from an encoder that is coupled to the motor, in order to allow the motor to rotate until it reaches a prefixed limit stop. The two micro-controllers and the control unit are programmed to allow the electronic setting of the position of the lifting and lowering limit stops of the roller shutter through a proper sequential depression of said push buttons. It is also possible to enable one transmitter to control a plurality of radio receivers.

17 Claims, 3 Drawing Sheets

ELECTRONIC CONTROL SYSTEM WITH RADIO REMOTE CONTROL SETTING OF LIMIT STOPS FOR MOTORS FOR THE OPERATION OF WINDING DEVICES

BACKGROUND OF THE INVENTION

1. Field of the Invention

The present invention refers to an electronic control system for motors for the operation of winding devices, such as roller shades, roller shutters, rolling gates and similar, comprising a radio receiver controlled by a radio transmitter.

2. Related Art

In the last few years the custom to use electric controls for the opening and closing movements of roller shutters has been increasingly spreading, especially with the metallic ones, more resistant to force opening but also much heavier than the wooden or plastic ones.

A reversible tubular electric ratiomotor having proper power and speed is therefore applied inside the rotating drum onto which the shutter is winding and a pair of push-button power switches is provided to allow the user to control from the ground the operation of the ratiomotor in one sense or in the other for the corresponding movement of the roller shutter opening or closing.

The end of the opening or closing movement was originally determined by the simple release of the button being pressed, but has subsequently been made automatic by the employment of suitable limit stops associated with the winding drum.

Afterwards there has been a shift to the electronic control of the movement, that is obtained by inserting in the tubular motor an encoder that generates impulses at each prefixed angle of rotation of the drum and also by providing a push-button control panel provided with memory, that by gathering and counting the impulses transmitted by the encoder, allows to memorize desirable limit stop positions at first and then to control in a repetitive way the opening and closing movements of the roller shutter up to the aforementioned limit stop positions.

Possible positioning errors at the end of the opening or closing movement, due to the inevitable inertia of the shutter at the end of the movement and to the possibility of a settling re-descent, can be automatically compensated by electronic control systems for roller shutters, as described for example in EP-A-0671676.

These electronic remote control systems that provide for a radio receiver associated with each winder operating motor and preferably included therein and a portable radio transmitter available to the user on the ground are particularly appreciated.

In such a case, each radio transmitter must have its own identification code that is stored in and can therefore be recognized by the purposely enabled receiver only so as to grant a high safety level to the winding system.

An example of remote control system for transmitting and receiving codified signals that allows the desired dialog univocality between the transmitter and the receiver and, by storing the identification code in the receiver by self-learning, avoids any necessity to physically accede to the receiver, is described in the Italian patent application n. VE97A00021, filed on Jun. 6, 1997 in the name of TELECO AUTOMATION s.r.l.

The usefulness of this system is however limited to enable the transmitters to the control of the respective receivers, while no solution is provided for the setting of the limit stops, which has to be carried out manually, by uncomfortable access to the receiver associated with the winder drum.

OBJECTS AND SUMMARY OF THE INVENTION

In view of the described state of the art, a first object of the present invention is to provide an electronic control system for roller shutters and roller shades, comprising a radio receiver and a radio transmitter, that would allow the remote controlled setting of the limit stops position.

A second object of the present invention is to provide an electronic control system for a plurality of winding devices, each provided with a radio receiver, in which a single radio transmitter is enabled to operate simultaneous remote control of all said winding devices.

According to the present invention, the first object is obtained by an electronic control system for motors for the operation of winding devices, such as roller shades, roller gates, rolling shutters and similar, comprising a radio receiver included in the controlled motor and a portable radio transmitter available to the user, wherein the radio transmitter comprises at least two push-buttons for the control of the lifting and lowering movement of the winding device, a radio signal transmitting section provided with an antenna, and a first micro-controller with a first code memory that, at each pressure on at least one of the control push-buttons, sends a codified signal having a respective identification code of the push-button being pressed to the transmitting section, and wherein the radio receiver comprises a radio signal receiving section provided with an antenna and being suitable to receive the codified signal being transmitted through the transmitting section of the radio transmitter, and a second micro-controller with a second code memory, that at each received signal having one of the codes of the second memory generates a control signal for a control unit provided with a third memory that, upon reception of the control signal, starts the motor in one sense of rotation or in the opposite sense according to the identity of the radio-transmitter push-button being pressed and receives identification data of the rotation angle from an encoder coupled to the motor, so as to allow the rotation of the motor itself up to reach a prefixed limit stop, characterized in that, in order to allow the electronic setting of the position of the lifting and lowering limit stops of the winding device, the first micro-controller is programmed in such a way as to generate a first or second codified signal depending on whether a first or second of said control push buttons is pressed, and the second micro-controller is programmed in such a way that, when receiving one of said first or second codified signal, it causes the generation of a first control signal for driving the motor until a first position of limit stop is reached and an information on the limit stop position generated by the encoder is memorized in said third memory and associated with the pressed push-button that has generated said codified signal, so that subsequently, each time that such push-button gets pressed, the system is ready to have the winding device automatically execute the desired movement up to the programmed limit stop position, the aforementioned sequence being repeated for the setting of a second limit stop position corresponding to the pressure on the other one of said first or second push-buttons.

According to another aspect of the present invention the second object is obtained by an electronic control system for motors for the operation of winding devices, such as roller shades, roller gates, rolling shutters and similar, comprising a plurality of radio receivers included in respective controlled motors and a portable radio transmitter available to the user, wherein the radio transmitter comprises at least two push-buttons for the control of the lifting and lowering movement of the winding device, a radio signal transmitting section provided with an antenna, and a first micro-controller provided with a first code memory that, at each pressure on at least one of the control push-buttons, sends a codified signal having a respective identification code of the push-button being pressed to the transmitting section, and wherein each radio receiver comprises a radio signal receiving section provided with an antenna and being suitable to receive the codified signal being transmitted through the transmitting section of the radio transmitter, and a second micro-controller provided with a second code memory, that at each received signal having one of the codes of the second memory generates a control signal for a control unit provided with a third memory that, upon reception of the control signal, starts the motor in one sense of rotation or in the opposite sense according to the identity of the radio transmitter push-button being pressed and receives identification data of the rotation angle from an encoder coupled to the motor, so as to allow the rotation of the motor itself up to reach a prefixed limit stop, characterized in that the radio transmitter comprises a further push-button connected to the first micro-controller to cause it to generate a radio receiver enabling codified signal and third and fourth push-buttons connected to the first-micro-controller to generate a further codified signal for centralized control of a plurality of radio receivers.

BRIEF DESCRIPTION OF THE DRAWINGS

The features and advantages of the present invention will be made evident by the following detailed description of an embodiment thereof, that is illustrated as a non limiting example in the enclosed drawings, in which.

Figure 1:
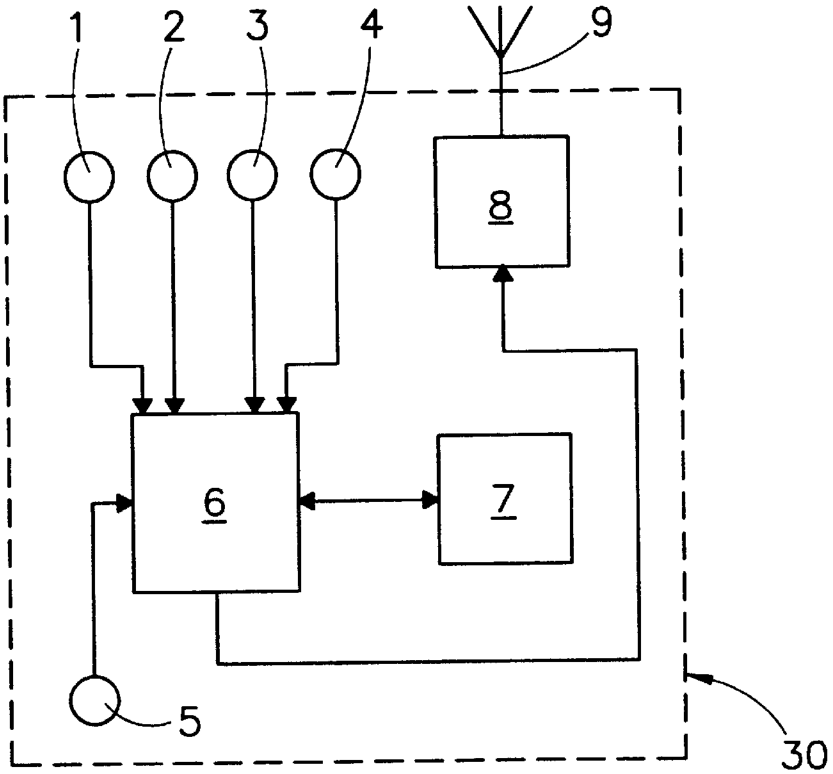
FIG. 1 schematically shows the functional block diagram of a radio transmitter according to the present invention.

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

In FIG. 1 the block diagram of a radio transmitter 30 according to the present invention is rendered in a schematic way. There are provided four push-buttons 1, 2, 3 and 4, corresponding to an equal number of channels, the first two purposed to the individual control respectively of lifting and lowering, and the other two destined to centralized controls. The aforesaid channels 1, 2, 3 and 4 are connected with a micro-controller 6, that is connected in a biunivocal way to a memory 7 containing identification codes memorized by the supplier, and connected, in addition, to a signal transmitting section 8 comprising an antenna 9. In addition, a receiver enabling push-button 5 connected with the micro-controller 6 is provided.

Figure 4:
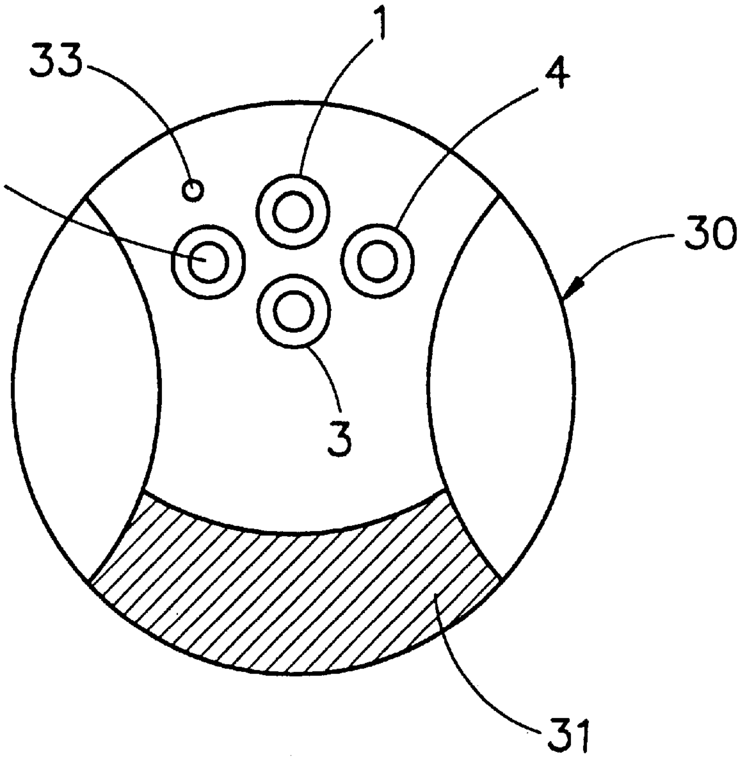
FIG. 4 represents the external structure of a radio transmitter according to the present invention.
Figure 5:
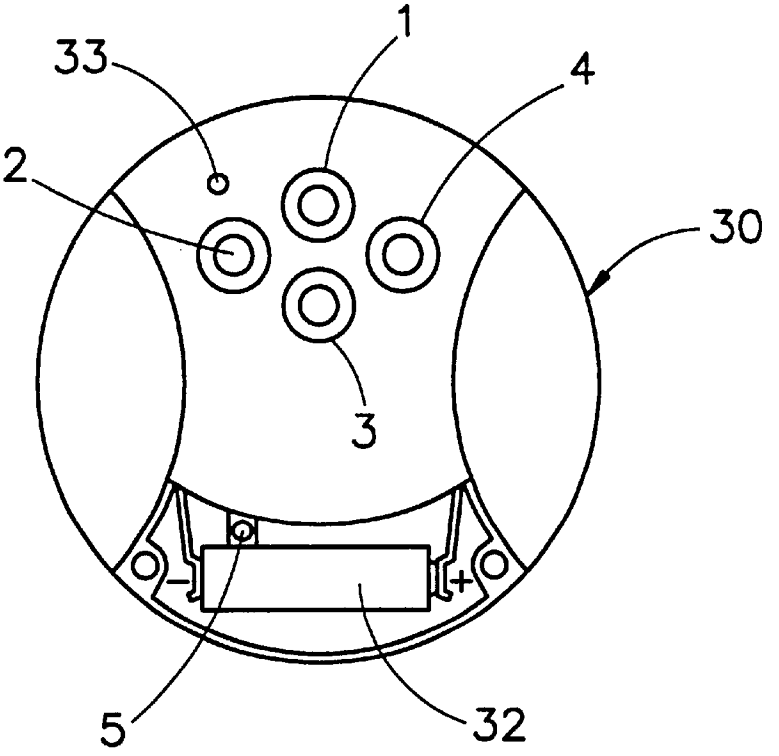
FIG. 5 shows the same radio transmitter of FIG. 4, with open access to a battery.

In FIGS. 4 and 5 a radio transmitter 30 as it appears to the user is shown, in which the two lifting and lowering push-buttons 1 and 2, the two centralization push-buttons 3 and 4 and a red LED radio emission signaller 33 are present. In FIG. 4 there is a lid 31 for closing the power supply space, while in FIG. 5 the same lit has been removed and therefore a supply battery 32 and the receiver enabling push-button 5 are visible.

Figure 2:
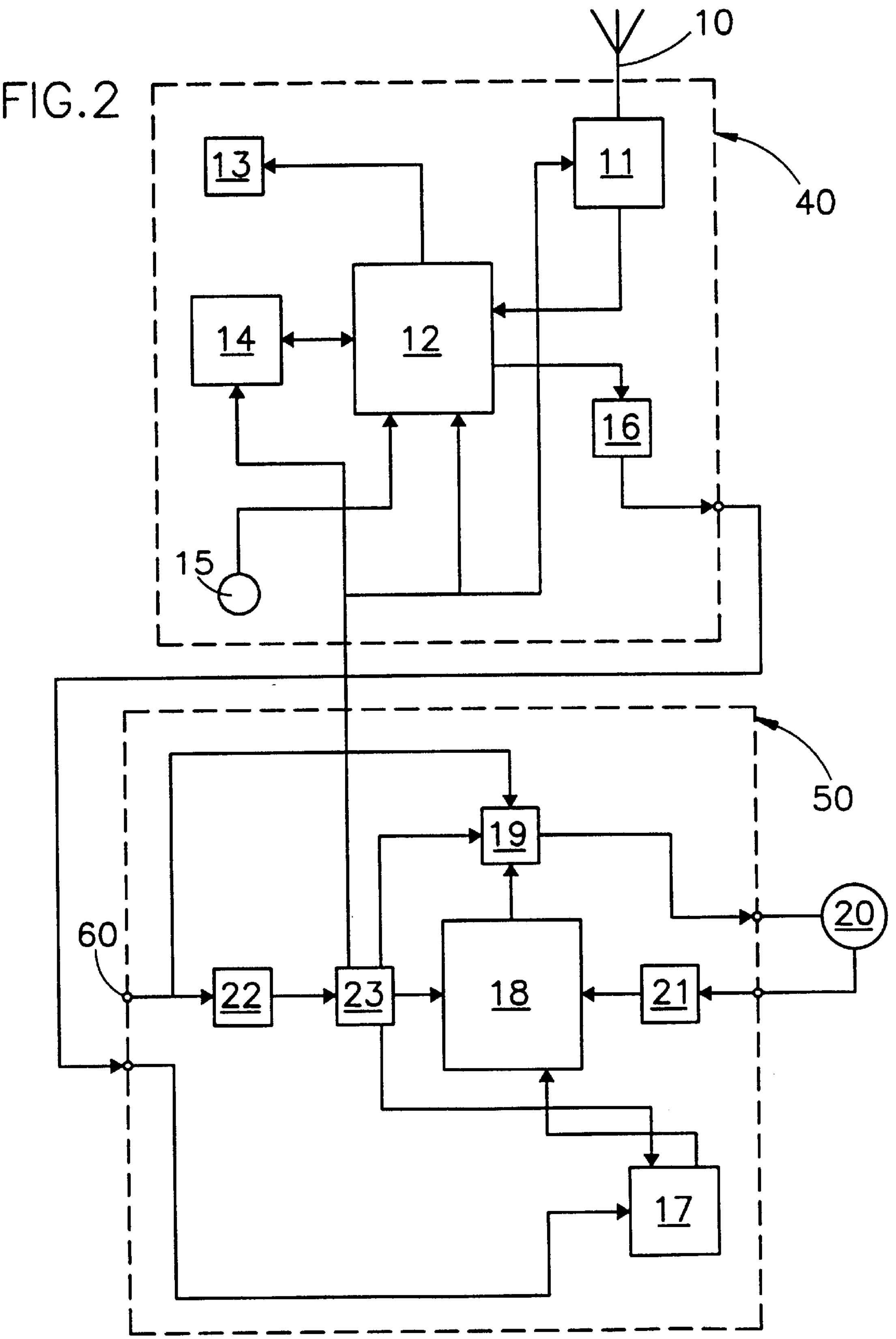
FIG. 2 schematically shows the functional block diagram of a radio receiver according to the present invention.

FIG. 2 represents the block diagram of a radio receiver according to the present invention, divided into two main functional blocks 40 and 50, respectively a radio receiver and a power block. In the control block 40 there are a signal receiving section 11 with a relative antenna 10, a micro-controller 12 which receives signals from the receiving section 11 and is connected in a biunivocal way with a RAM memory 14, an acoustic signaller 13 that is piloted by the micro-controller 12, an amplifier 16 located at the output of the control block 40, and finally a push-button 15 for cancellation of the RAM memory 14.

Downstream from the control block 40, and in particular from the amplifier 16, a power block 50 is connected, that comprises a decoding receiver 17 that is connected to a control unit 18, that pilots in turn a power device 19 connected to a ratiomotor 20 destined to the bi-directional operation of the winding shutter or shade. In addition an encoder 21 is provided that is physically associated with the ratiomotor 20 in the way described in EP-A-0671676 and is functionally interposed between the ratiomotor 20 and the control unit 18. The encoder 21 is also preferably of the type capable to detect the sense of rotation of the ratiomotor 20, and therefore of the winding drum of the winding shutter or shade, as also described in EP-A-0671676. A rectifier 22 and a stabiliser 23, downstream from it, provide an appropriate power supply to the microcontroller 12, to the RAM memory 14, to the receiving section 11, to the control unit 18, to the power device 19 and to the decoding receiver 17, getting it from a mains terminal.

Figure 3:
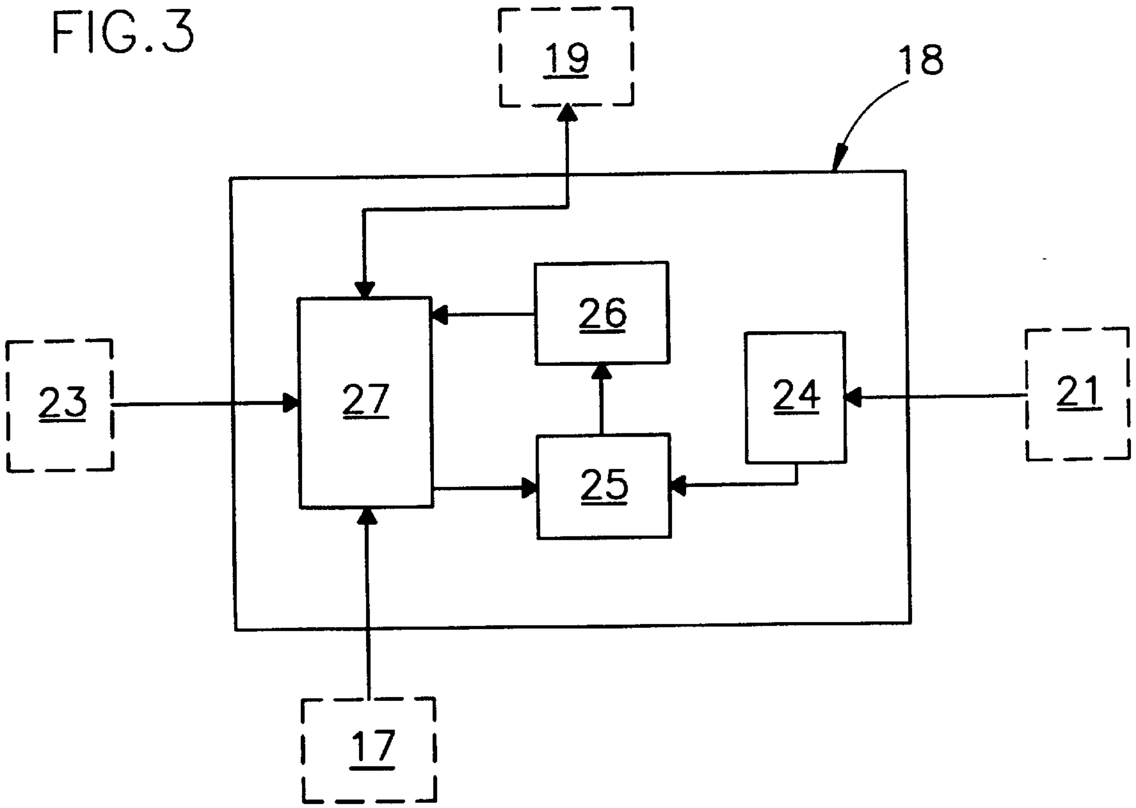
FIG. 3 represents in a schematic way the functional block diagram of a radio receiver unit included in FIG. 2

In FIG. 3 a functional block scheme of the control unit 18 is schematically shown, in which the proper connections with the external blocks are also rendered: internally, the unit 18 is subdivided into a counter block 24, which receives signals from the encoder 21 and is connected to a non-volatile memory EEPROM 25, a comparator block 26, which receives signals from the memory 25 and conveys them to a micro-controller 27, the latter being connected to the remaining external blocks and to the same memory 25.

The control system according to the invention is therefore composed of a radio receiver 40, 50, mounted on the stationary structure of the winding device and, particularly, within the ratiomotor, and of a portable radio transmitter 30 with which it is possible to remotely control the radio receiver and therefore the ratiomotor 20. Each transmitter has four normal-use channels that are operated by the four push-buttons 1–4. Such push-buttons are utilizable to control the two senses of movement (lifting and lowering) of the single ratiomotor (push-buttons 1 and 2) and to control the two senses of movement of other ratiomotors in a centralized way (push-buttons 3 and 4).

Through the radio transmitter 30 it is also possible to effect the setting of the limit stop points of the device being operated (roller shutter or roller shade), to enable and cancel more transmitters with regards to a receiver element.

According to the application for Italian patent no. VE97A000021 mentioned above, each transmitter sends commands to a receiver by using a signal characterized by an emission code having a determined protocol (for example made up of 66 bits), which is changed at each transmission in a random way (Rolling-code system). Each transmitter also has its own identification code that is recognisable only by the enabled receiver, which code characterises the enabled receiver from others.

Each control system according to the invention, as already said consisting of a transmitter and a receiver, is destined to be supplied to the user with the transmitter buttons 1 and 2 enabled only, which control lifting and lowering of the winding shutter. First of all it is necessary to carry out setting of the limit stop positions and to this purpose the following operative stages must be performed:

a) The push-buttons 1 and 2 of the radio transmitter must be pressed simultaneously for a certain period of time (for example 15 seconds) and the micro-controller 6 immediately sends signals to the memory 7 which contains the relative codes and in turn sends instructions to the micro-controller 6; through the transmitting section 8, the latter sends a codified radiofrequency signal to the control block 40, that is tuned with its receiving section 11 at the same frequency of transmission, in order to be conveyed to the micro-controller 12 which activates the sound signaller 13 in such a way that it produces a sound uninterruptedly for the entire aforesaid period of time. The micro-controller 12 also sends, through the amplifier stage 16 and the decoder receiver 17, a control signal to the control unit 18, which informs it that at the end of the 15 seconds it must zero the entire EEPROM memory 25. In this way, the system is ready for the limit stop information to be set in the EEPROM memory 25.

b) Once the two push-buttons 1 and 2 are released, only one of the two previous push-buttons must be pressed (for example the push-button 1 corresponding to the lifting movement) until the desired (upper) limit stop position is reached and then it must be released. When pressing the push-button 1, the micro-controller 6 is activated and sends signals to the memory 7, which contains codes relative to the channel being activated, and it receives instructions therefrom and then sends a codified signal to the receiver through the section 8; the micro-controller 12 informs the control unit 18 of the signal being received, and the latter pilots the power device 19 which in turn activates the ratiomotor 20 and the winding shutter is lifted. The encoder 21 reads the pitches of the ratiomotor 20 and sends pulses to the unit 18 that through the function 24 starts to count them until the button 1 is released and the movement of the ratiomotor stops.

c) At this point the buttons 1 and 2 must be simultaneously pressed again for a determined interval of time (for example more than 1 second) and then, once they are released, the lifting button 1 must be immediately pressed (within 0.25 seconds) for a certain time, for example more than 1 second. In this way the information on the number of pulses that is generated by the encoder 21 is memorized in the EEPROM memory 25 and in addition such information gets associated with the lifting button 1 in such a way that subsequently each time the push-button 1 gets pressed, the system is ready to execute in a repetitive and automatic way the opening (lifting) movement of the winding shutter up to the programmed limit stop position.

With these operations the upper limit stop position is memorized and in order to memorize the lower one too, it is necessary to press the (lowering) button 2 until the desired limit stop position is reached, to release it, to press simultaneously the buttons 1 and 2 for a time longer than 1 second, then to release them and finally to immediately press (within 0.25 seconds) the lowering push-button 2 for a time longer than 1 second: in an analogous way as before, the information relative to the upper limit stop position is memorized in the memory 25, so that at each subsequent command of the press-button 2 the mobile element automatically reaches the aforesaid lower limit stop point.

At this point the transmitter is capable to control the lifting and the lowering of the roller shutter until the automatic arrest at the relative limit stop. For example, by pressing the lifting push-button 1, the micro-controller 6, through the transmitting section 8, sends a codified signal to the control block 40 and therefore the micro-controller 12 is programmed in order to transmit a control signal to the power block 50 in which the control unit 18 is predisposed in such a way so as to activate the power device 19 and to obtain the relative movement of the ratiomotor 20; the number of pulses generated by the encoder 21 and associated with the movement of the ratiomotor 20 is then counted by the block 24 and compared, by means of the block 26, with the information stored in the memory 25, indicating the limit stop position, and in the instance in which the two data become equal, the micro-controller 27 automatically stops the ratiomotor 20 and the winding shutter has reached the desired limit stop position.

If one wishes to enable also the two channels 3 and 4 devoted to the centralized control of more receivers associated with respective winding shutters, one must proceed in the following way:

a) in the first stage, in order to enable a determined receiver, the push-button 5 is pressed for an interval of time within which the micro-controller 6 sends a codified signal to the receiver by means of sections 8 and 11; the codified signal is memorized in the RAM memory 14 and the micro-controller 12 activates the sound signaller 13 in order to produce a continuous sound; in this way the receiver is enabled to memorize an additional channel in its RAM memory 14;

b) within a determined period of time (for example 5 seconds) from the beginning of the sound signal, it is necessary to press the push-button of the channel to be memorized in the memory 14, for example the push-button 3; the confirm of the memorisation being done is signalised by a change in the sound produced by the sound signaller 13; and c) in order to memorize the last channel remaining to be memorized it is necessary to repeat what described in the aforementioned points, in this case by pressing the push-button 4.

The same operation is to be repeated for all the other receivers intended for the centralized control by the same transmitter.

For the memorization of channels 1 and 2 and/or channels 3 and 4 of an additional transmitter, for example that arrives new from the supplier, in a system according to the present invention, provided only with its own transmitter, it is necessary to carry out, for each channel of each transmitter to be added, the same operations just described for the memorization of the centralized control channels 3 and 4.

Each receiver can, for example, memorize 64 channels and therefore it is possible to associate a maximum of 32 transmitters with centralized control channels 3 and 4, or 16 transmitters with four channels 1, 2, 3 and 4.

In order to cancel the channels of an additional transmitter or the channels 3 and 4 of the main transmitter it is necessary to carry out the following operations for each channel. The button 5 must be pressed for a certain number of times at regular intervals, within a determined period of time (for example for three times within 5 seconds), and in this way from the transmitter 30 to the receiver a codified signal is sent that reaches the micro-controller 12, which activates the sound signaller 13 in such a way that it produces a sound slowly and intermittently, and in addition it predisposes the RAM memory 14 so that some of its locations, relative to certain channels, get cancelled. The subsequent pressure on the push-button of the channel that is intended to be cancelled, within a prefixed time interval (for example 5 seconds) from the beginning of the sound signal, produces the cancellation of the locations in the RAM memory 14, exactly relative to that determined channel, in such a way that at each subsequent command given with the push-button of the channel that has been cancelled, the micro-controller 12, which gets the relative codified signal from the transmitter 30, does not receive any instruction from the RAM memory 14 and the power block 50 does not get piloted and therefore the ratiomotor 20 does not get activated.

While the invention has been particularly shown and described with reference to a preferred embodiment thereof, it will be understood by those skilled in the art that various changes in form and details may be made therein without departing from the spirit and scope of the invention.

What is claimed is:

1. An electronic control system for a motor for operation of a winding device comprising:

a radio receiver included in the motor being controlled; and a portable radio transmitter including:

first and second push-buttons for control of lifting and lowering movement of the winding device, a radio signal transmitting section including an antenna, and a first micro-controller with a first code memory that, at each pressure on at least one of the control push-buttons, sends a codified signal having a respective identification code of the push-button being pressed to the transmitting section; and wherein the radio receiver includes:

a radio signal receiving section including an antenna for receiving the codified signal from the portable radio transmitter, and a second micro-controller with a second code memory, that at each received signal having one of the codes of the second memory generates a control signal for a control unit provided with a third memory that, upon reception of the control signal:

starts the motor in one direction of rotation or in an opposite direction, according to the push-button of the radio transmitter being pressed, and receives identification data of an angle of rotation of the motor from an encoder coupled to the motor, so as to allow the rotation of the motor until a first limit stop position is reached;

wherein, in order to allow electronic setting of lifting and lowering limit stop postions of the winding device, the first micro-controller is generates a first or second codified signal depending on whether the first or second push button is pressed, and wherein the second micro-controller, when receiving one of the first or second codified signal, generates a first control signal for driving the motor until the first limit stop position is reached, and wherein information on the first limit stop position generated by the encoder is memorized in the third memory and associated with the pressed push-button that generated the codified signal, so that subsequently, when the push-button is pressed, the system can have the winding device automatically execute the desired movement up to the first limit stop position, the aforementioned sequence being repeated for a setting of a second limit stop position corresponding to operation of the other one of the first or second push-buttons, and wherein the first micro-controller is programmed so that a third codified signal initially generated by a simultaneous depression of the first and second push-buttons and maintained for a first time interval causes the micro-controller to generate a zeroing signal for the third memory, and wherein a repetition of the third codified signal for a second time interval after the first or second codified signal, followed by a repetition of the first or second codified signal for a third time interval causes the first micro-controller to generate a second control signal for the second micro-controller to memorize in the third memory the information on the first or second limit stop positions generated by the encoder.

2. An electronic control system for a motor for operation of a winding device comprising:

a radio receiver included in the motor being controlled; and a portable radio transmitter including:

first and second push-buttons for control of lifting and lowering movement of the winding device, a radio signal transmitting section including an antenna, and a first micro-controller with a first code memory that, at each pressure on at least one of the first and second push-buttons, sends a codified signal having a respective identification code of the push-button being pressed to the transmitting section;

wherein the radio receiver includes:

a radio signal receiving section including an antenna for receiving the codified signal from the portable radio transmitter, and a second micro-controller with a second code memory, that, at each received signal having one of the codes of the second memory, generates a control signal for a control unit provided with a third memory that, upon reception of the control signal, (a) starts the motor in one direction of rotation or in an opposite direction, according to the push-button of the radio transmitter being pressed, and (b) receives identification data of an angle of rotation of the motor from an encoder coupled to the motor, so as to allow the rotation of the motor until a predetermined limit stop is reached, wherein, in order to allow an electronic setting of limit stop positions of the winding device, the first micro-controller generates a first or second codified signal depending on whether a first or second control push buttons is pressed, the second micro-controller, when receiving one of the first or second codified signal, generates a first control signal for driving the motor until a first limit stop position is reached, and information on the first limit stop position generated by the encoder is memorized in the third memory and associated with the pressed push-button that has generated the codified signal, so that subsequently, when the first or second push-button is pressed, the system can have the winding device automatically execute the desired movement up to the first limit stop position, the aforementioned sequence being repeated for setting of a second limit stop position corresponding to operation of the other one of the first or second push-button, wherein the radio transmitter further includes:

at least two centralized control push-buttons; and a receiver enabling push-button, which are all connected to the first micro-controller, wherein depression of the receiver enabling push button and a subsequent depression of one of the at least two centralized control push-buttons of the same radio transmitter or of one of first and second push-buttons, or two centralized control buttons of another radio transmitter within a fourth time interval generates a further codified signal for the second micro-controller to memorize, in the second memory, an identification code of the pressed push-button.

3. The electronic control system according to claim 2, wherein a simultaneous depression of the receiver enabling push-button for a predetermined number of times and a subsequent depression one of the at least two centralized control push-buttons of the same radio transmitter, or of one of the two lifting and lowering control push-buttons, or the two centralized control buttons of another radio transmitter within the fourth time interval cause generation of an additional codified signal for the second micro-controller to cancel the identification code of the push-button being pressed in the second memory.

4. The electronic control system according to claim 2, wherein the radio receiver further includes a cancellation button for manual cancellation of the second memory.

5. The electronic control system according to claim 2, wherein the radio receiver further includes an amplifier stage at an output of the second micro-controller.

6. The electronic control system according to claim 2, wherein the radio receiver further includes a decoding receiver for receiving the control signals from the second micro-controller and sending them properly decoded to the control unit.

7. The electronic control system according to claim 2, wherein the radio receiver further includes a rectifier, and a stabilizer downstream from the rectifier, for providing a power supply to the radio receiver.

8. The electronic control system according to claim 2, wherein the radio receiver further includes a sound signaller controlled by the second micro-controller to generate a sound each time that the micro-controller receives a codified signal for a predetermined time interval.

9. An electronic control system for a motor for operation of winding devices comprising:

a radio receiver included in the motor being controlled; and a portable radio transmitter including:

first and second push-buttons for control of lifting and lowering movements of the winding device, a radio signal transmitting section including an antenna, and a first micro-controller with a first code memory that, at each pressure on at least one of the first and second push-buttons, sends a codified signal having an identification code of the pressed push-button to the transmitting section;

wherein the radio receiver includes:

a radio signal receiving section including an antenna for receiving the codified signal transmitted by the transmitting section; and a second micro-controller with a second code memory, that upon receiving a signal having one of the codes of the second memory:

generates a control signal for a control unit provided with a third memory that, upon reception of the control signal, starts the motor in one direction of rotation or in an opposite direction of rotation according to the identity of the pressed push-button, and receives identification data of an angle of rotation of the motor from an encoder coupled to the motor, so as to allow the rotation of the motor until a limit stop is reached, wherein the radio transmitter further includes:

a third push-button connected to the first micro-controller to generate a radio receiver enabling codified signal, fourth and fifth push-buttons connected to the first micro-controller to generate a further codified signal for centralized control of a plurality of radio receivers, wherein the fourth and fifth push-buttons and the third push-button are all connected to the first micro-controller, so that depression of the third push button generates the receiver enabling codified signal, wherein subsequent depression of one of the fourth and fifth push-buttons of the same radio transmitter, or of one of the first and second push-buttons, or of one of fourth and fifth buttons of another radio transmitter within a predetermined interval of time generates a further codified signal and memorisation of an identification code of the pressed push-button in the second memory.

10. The electronic control system according to claim 9, wherein simultaneous depression of the third push-button for a predetermined number of times and subsequent depression of one of the fourth and fifth push-buttons of the same radio transmitter, or of one of the first and second push-buttons, or fourth and fifth buttons of the another radio transmitter within the predetermined interval of time generates of an additional codified signal for the second micro-controller to cancel the identification code of the pressed push-button in the second memory.

11. The electronic control system according to claim 9, wherein the radio receiver further includes a cancellation button for manual cancellation of the second memory.

12. The electronic control system according to claim 9, wherein the radio receiver further includes an amplifier stage at an output of the second micro-controller.

13. The electronic control system according to claim 9, wherein the radio receiver further includes a decoding receiver for receiving the control signals from the second micro-controller and sending them, after being decoded, to the control unit.

14. The electronic control system according to claim 9, wherein the radio receiver further includes a rectifier and a stabiliser downstream from the rectifier.

15. The electronic control system according to claim 9, further comprising a sound signaller included in the radio receiver and controlled by the second micro-controller to generate a sound each time that the micro-controller receives an appropriate codified signal for a predetermined time interval.

16. An electronic control system comprising:

a portable radio transmitter comprising:

first and second push-buttons for controlling rotation of a winding motor, and a first micro-controller with a first code memory that, at each pressure on at least one of the first and second push-buttons, transmits a signal identifying the pressed push-button; and a radio receiver for coupling to the winding motor and including:

a second micro-controller with a second code memory, which, upon each receipt of the encoded signal, generates a control signal for a control unit provided with a third memory, wherein the control unit, upon reception of the control signal:

starts rotation of the winding motor in a direction corresponding to the push-button being pressed, and receives motor angle of rotation information for stopping the rotation when a first or second limit stop is reached, wherein, to set the first or second limit stops:

the first micro-controller generates a first or second encoded signal depending on whether a first or second control push button is pressed, and the second micro-controller, when receiving one of the first or second encoded signals, generates a first control signal for driving the winding motor until the first limit stop position is reached, and information on the first limit stop position is stored in the third memory and associated with a corresponding push-button, so that subsequently, when the push-button is pressed, the motor can rotate to the first limit stop position, the aforementioned sequence being repeated to set the second limit stop position corresponding to operation of the other one of the first or second push-buttons;

wherein the first micro-controller generates a zeroing signal for the third memory based on a third encoded signal initially generated by a simultaneous depression of the first and second push-buttons and maintained for a first time interval, and wherein the first micro-controller generates a second control signal for the second micro-controller to store in the third memory the limit stop position based on a repetition of the third encoded signal for a second time interval after the first or second encoded signal, followed by a repetition of the first or second encoded signal for a third time interval.

17. An electronic control system for a winding motor comprising:

a portable radio transmitter including:

first and second push-buttons for control of rotation of the winding motor, a first micro-controller with a first memory that, at each pressure on at least one of the first and second push-buttons, transmits a signal identifying the pressed push-button and a third push-button connected to the first micro-controller to generate a receiver enabling signal, and fourth and fifth push-buttons connected to the first micro-controller to generate another encoded signal for centralized control of a plurality of radio receivers; and a radio receiver for coupling to the winding motor and including:

a second micro-controller with a second memory, that upon receiving the encoded signal (a) generates a control signal for a control unit with a third memory that, upon reception of the control signal, (b) starts rotation of the motor in a direction corresponding to the pressed push-button, and (c) receives motor angle of rotation information, for stopping the rotation of the motor when a limit stop is reached.

* * * * *